US010878442B1

(12) United States Patent
Lewis et al.

(10) Patent No.: US 10,878,442 B1
(45) Date of Patent: Dec. 29, 2020

(54) SELECTING CONTENT FOR CO-LOCATED DEVICES

(71) Applicant: Google LLC, Mountain View, CA (US)

(72) Inventors: Justin Lewis, South San Francisco, CA (US); Gavin James, Los Angeles, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 16/371,177

(22) Filed: Apr. 1, 2019

Related U.S. Application Data

(63) Continuation of application No. 14/284,075, filed on May 21, 2014.

(51) Int. Cl.
*G06Q 30/02* (2012.01)

(52) U.S. Cl.
CPC ................................ *G06Q 30/0241* (2013.01)

(58) Field of Classification Search
CPC ........................... G06Q 30/02; G06Q 30/0241
See application file for complete search history.

(56) References Cited

U.S. PATENT DOCUMENTS

2007/0116199 A1 5/2007 Arrasvuori et al.
2010/0121705 A1 5/2010 Ramer et al.
2010/0177178 A1 7/2010 Burns et al.
2010/0324891 A1 12/2010 Cutler
2011/0191253 A1 8/2011 Pilskalns
2013/0070933 A1 3/2013 Itou
2013/0170813 A1 7/2013 Woods et al.
2013/0203345 A1 8/2013 Fisher
2013/0276023 A1* 10/2013 Kent ................. H04N 21/4532 725/34
2013/0276063 A1 10/2013 Hahm
2013/0288723 A1 10/2013 Bell et al.
2013/0331970 A1* 12/2013 Beckhardt .............. G06F 3/165 700/94
2014/0006496 A1* 1/2014 Dearman ............... H04L 67/16 709/204

(Continued)

OTHER PUBLICATIONS

Filonenko et al., "Investigating ultrasonic positioning on mobile phones" (published in 2010 International Conference on Indoor Positioning and Indoor Navigation on Sep. 1, 2010) (Year: 2010).*

*Primary Examiner* — James M Detweiler
*Assistant Examiner* — Patrick Kim
(74) *Attorney, Agent, or Firm* — Fish & Richardson P.C.

(57) ABSTRACT

Methods, systems, and apparatus include computer programs encoded on a computer-readable storage medium, including a method for determining information. A first user device for presenting content to a user is identified. A second co-located device is identified. A determination is made, based on one or more criteria, to use audible or inaudible sound emitted from the first device to ascertain whether audio controls on the first device and a speaker associated with the first device are enabled. A token that is to be played on the first device is identified. A notification is provided to the second co-located device to listen for the token emitted by the first device. The token for playing on the first device is provided. Information related to a recording is received from the second co-located device. A determination is made whether the first device's audio controls and speakers are enabled.

18 Claims, 4 Drawing Sheets

200
Content Management System 110
Device Determination Criteria 131
Device Identification Engine 121
Determination to Listen 214
Tokens 132
Device Determination Engine 122
Co-location Indicators 133
Determination that first device's audio controls and speakers are enabled 220
Content 201
Identification 210
Token to be played at First Device 206
Notification to Second Device to Listen for Token 216
Identification 212
Recording Information 218
Colocation Area 208
First Device 106a
User(s) 202a
106c
Sound 204
Inaudible Sound 204a
Second Co-located Device 106b
User 202b

(56) References Cited

U.S. PATENT DOCUMENTS

| | | | | |
|---|---|---|---|---|
| 2014/0162688 | A1* | 6/2014 | Edge | H04H 20/08 455/456.1 |
| 2014/0222956 | A1* | 8/2014 | Courtney, III | H04L 67/2823 709/217 |
| 2014/0274031 | A1 | 9/2014 | Menendez | |
| 2015/0046953 | A1 | 2/2015 | Davidson | |

* cited by examiner

SELECTING CONTENT FOR CO-LOCATED DEVICES

CROSS-REFERENCE TO RELATED APPLICATION

This application is a continuation application of U.S. application Ser. No. 14/284,075, filed May 21, 2014, which is incorporated by reference.

BACKGROUND

This specification relates to information presentation.

The Internet provides access to a wide variety of resources. For example, video and/or audio files, as well as webpages for particular subjects or particular news articles, are accessible over the Internet. Access to these resources presents opportunities for other content (e.g., advertisements) to be provided with the resources. For example, a webpage can include slots in which content can be presented. These slots can be defined in the webpage or defined for presentation with a webpage, for example, along with search results. Content in these examples can be of various formats, while the devices that consume (e.g., present) the content can be equally varied in terms of their type and capabilities.

Content slots can be allocated to content sponsors as part of a reservation system, or in an auction. For example, content sponsors can provide bids specifying amounts that the sponsors are respectively willing to pay for presentation of their content. In turn, an auction can be run, and the slots can be allocated to sponsors according, among other things, to their bids and/or a likelihood that the user will interact with the content presented.

SUMMARY

In general, one innovative aspect of the subject matter described in this specification can be implemented in methods that include a computer-implemented method for providing content. The method includes identifying a first user device for presenting content to a user. The method further includes identifying a second co-located device. The method further includes determining, based on one or more criteria, to use audible or inaudible sound emitted from the first device to ascertain whether audio controls on the first device and a speaker associated with the first device are enabled. The method further includes identifying a token that is to be played on the first device. The method further includes providing a notification to the second co-located device to listen for the token emitted by the first device. The method further includes providing the token for playing on the first device. The method further includes receiving, from the second co-located device, information related to a recording in response to the notification. The method further includes determining whether the first device's audio controls and speakers are enabled based on the received information.

These and other implementations can each optionally include one or more of the following features. The first device and the second co-located device are selected from the group comprising a mobile telephone, a mobile electronic device with a microphone, a desktop computer, and another electronic device with a microphone. The method can further include determining that the second co-located device is in proximity to the first device. Determining can include determining that the second co-located device is likely to be in proximity to the first device based on stored information related to prior location checks for the first device and the second co-located device. Determining, based on one or more criteria, to use audible or inaudible sound can include determining that the user is logged in, that a new session has started, that a current user session is likely to present a content item that is best presented when audio functions are enabled, or that a request for content has been determined for which one or more of the content items responsive to the request are content items that include audio. Determining, based on one or more criteria, to use audible or inaudible sound can include criteria for determining a type of sound selected from the group comprising sub-audible, super-audible and audible sound. Identifying a token can include identifying a signature of a sound snippet that is to be played on the first device. The notification can be a push notification. The push notification can include a time to listen. The push notification can include the token. Providing the token can include providing the token in association with other content that is delivered to the first device. Providing the token includes identifying a portion of audio content that has been determined to be provided to the first device in response to actions of the user, selecting a portion of the audio content, and creating the token based on the selected portion. Receiving from the second co-located device information can further include receiving the recording. The method can further include filtering the recording to isolate a frequency band associated with the token. Receiving from the second co-located device information can further include receiving an indication that the token was detected. The method can further include selecting content to deliver to the first device based on the determining. Selecting can include selecting items for inclusion in a feed associated with a social network. Selecting can include selecting sponsored content items for delivery to the first device responsive to received requests for content from the first device. The method can further include processing the received information from the second co-located device to determine whether or not the audio on the first device is enabled including comparing the received information to the token. The method can further include determining eligibility to deliver specific content to the user based on the determining whether the first devices audio controls and speakers are enabled. The method can further include determining an adjustment to a quality score used in an auction for selecting the specific content based on the determining whether the first devices audio controls and speakers are enabled. The method can further include repeating the determining for the first device and the second co-located device at a plurality of different times, storing an indicator of a likelihood that the first device and the second co-located device are actually co-located, and using the indicator to determine whether the first device's audio controls and speakers are enabled.

In general, another innovative aspect of the subject matter described in this specification can be implemented in computer program products that include a computer program product tangibly embodied in a computer-readable storage device and comprising instructions. The instructions, when executed by one or more processors, cause the processor to: identify a first user device for presenting content to a user; identify a second co-located device; determine, based on one or more criteria, to use audible or inaudible sound emitted from the first device to ascertain whether audio controls on the first device and a speaker associated with the first device are enabled; identify a token that is to be played on the first device; provide a notification to the second co-located device to listen for the token emitted by the first device;

provide the token for playing on the first device; receive, from the second co-located device, information related to a recording in response to the notification; and determine whether the first device's audio controls and speakers are enabled based on the received information.

In general, another innovative aspect of the subject matter described in this specification can be implemented in systems, including a system comprising one or more processors and one or more memory elements including instructions. The instructions, when executed, cause the one or more processors to: identify a first user device for presenting content to a user; identify a second co-located device; determine, based on one or more criteria, to use audible or inaudible sound emitted from the first device to ascertain whether audio controls on the first device and a speaker associated with the first device are enabled; identify a token that is to be played on the first device; provide a notification to the second co-located device to listen for the token emitted by the first device; provide the token for playing on the first device; receive, from the second co-located device, information related to a recording in response to the notification; and determine whether the first device's audio controls and speakers are enabled based on the received information.

Particular implementations may realize none, one or more of the following advantages. Presenting a video content item (e.g., an advertisement) that includes sound can be limited to user devices on which it is determined that the sound is enabled (e.g., not muted). A content item can be presented to a co-located user device (e.g., a networked television) having enhanced presentation characteristics rather than, or in addition to, presenting the content item on a user device, for example, having a small screen (e.g., smartphone).

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
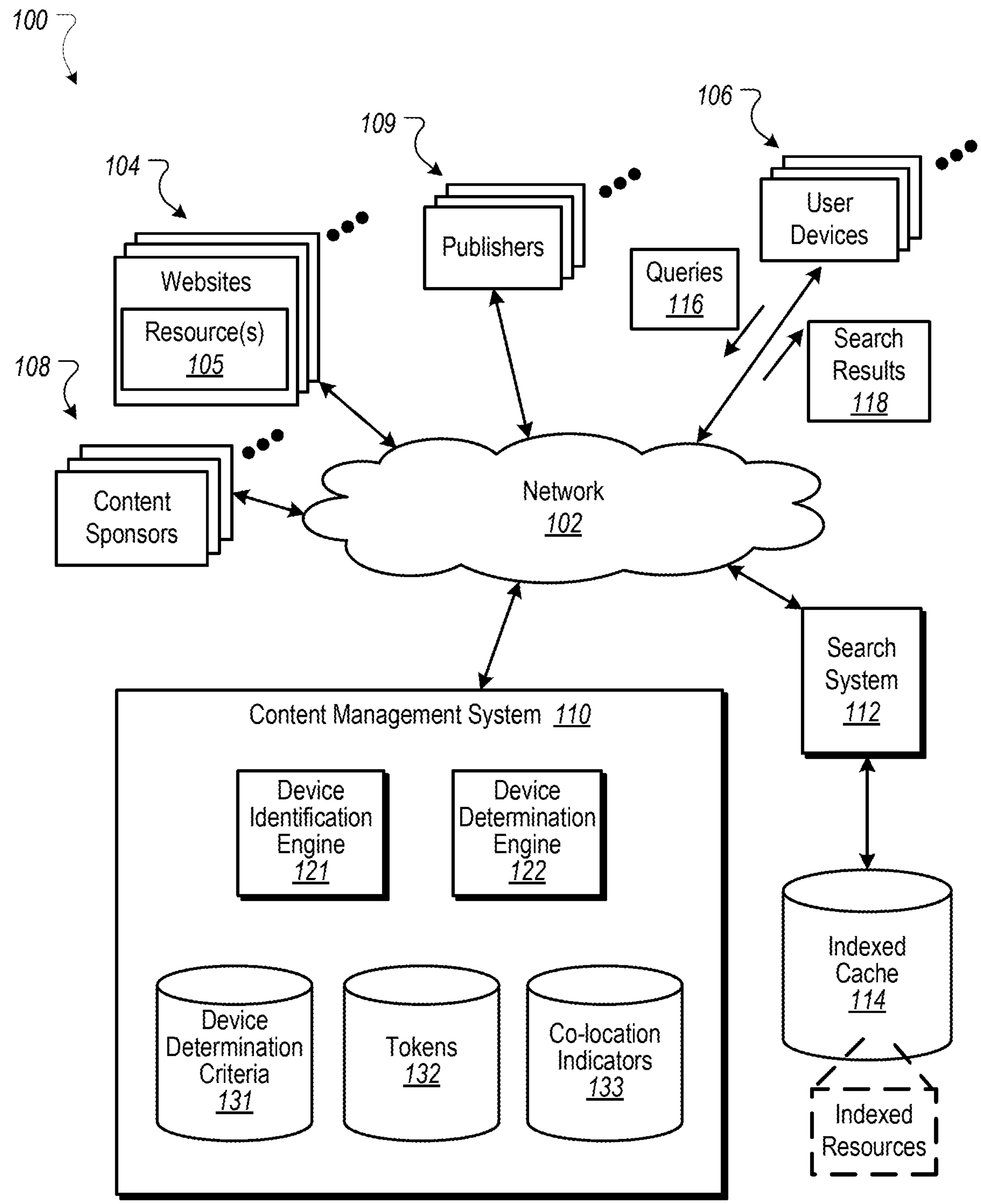
FIG. 1 is a block diagram of an example environment for delivering content.

Systems, methods, computer program products and mechanisms are described for determining when a presentation opportunity is for an individual (for an individual's personal consumption) or when a likelihood exists for identifying opportunities to reach larger audiences. For example, systems and methods can be used to determine whether speakers on a device are enabled, e.g., for the purpose of providing content to that device. Before making a decision to provide content on the device, for example, a determination can be made whether audio output (e.g., including speakers) on the device is enabled (e.g., non-muted). When enabled, a sound can be provided to the device. The sound can be of the form of a token or other snippet of sound. The token, for example, can be included in an audio stream that includes both conventional sound (i.e., sound that is associated with a given program presented on the first device) and the token. A microphone can be used on a second device (e.g., a second different device associated with the same user or a different user). For example, a specific sound played on a first device (e.g., a television) can be picked up by the microphone on a user's second co-located device (e.g., a mobile device).

In some implementations, listening that occurs among the co-located devices can be limited to user devices that are associated with the same user. In some implementations, listening that occurs between devices can be limited to a user's own devices for which the user has elected to allow the listening to occur, such as in privacy settings or other user settings on, or associated with, one or more devices of the user. For example, a user's smartphone can listen for sounds emitted from that same user's networked television. The listening can be selective, that is, a target sound can be identified and provided for comparison. Confirmation of the presence or absence of the specific target sound can be produced. Other sounds can be disregarded, including any other sounds unrelated to the specific target sound.

For situations in which the systems discussed here collect and/or use information including personal information about users or sound generated in proximity to a user, the users may be provided with an opportunity to enable/disable or control programs or features that may collect and/or use personal information (e.g., information about a user's social network, social actions or activities, a user's preferences or a user's current location or environment, including sound generated in proximity to the user). In addition, certain data may be treated in one or more ways before it is stored or used, so that personally identifiable information associated with the user is removed. For example, a user's identity may be anonymized so that the no personally identifiable information can be determined for the user, or a user's geographic location may be generalized where location information is obtained (such as to a city, ZIP code, or state level), so that a particular location of a user cannot be determined.

In some implementations, users can specify whether or not to allow their devices to be used for determining whether co-located devices' speakers are enabled. For example, users can specify that their devices are not authorized to send or receive/record sounds (e.g., using user settings or user preferences), or that their devices are not to be used in association with these applications (e.g., testing speakers of other users' devices). In some implementations, users can be notified that device listening functionality is available and asked if they want their devices to participate.

FIG. 1 is a block diagram of an example environment 100 for delivering content. The example environment 100 includes a content management system 110 for selecting and providing content in response to requests for content. The example environment 100 includes a network 102, such as a local area network (LAN), a wide area network (WAN), the Internet, or a combination thereof. The network 102 connects websites 104, user devices 106, content sponsors 108 (e.g., advertisers), publishers 109, and the content management system 110. The example environment 100 may include many thousands of websites 104, user devices 106, content sponsors 108 and publishers 109.

The environment 100 can include plural data stores, which can be stored locally by the content management system 110, stored somewhere else and accessible using the network 102, generated as needed from various data sources, or some combination of these. A data store of device determination criteria 131, for example, can include, criteria used to determine whether or not a device is to listen for sounds (e.g., inaudible sounds) among co-located devices. For example, the criteria can include device characteristics, e.g., that identify a minimum screen size for which device listening should occur, e.g., as being indicative of an opportunity to present content to multiple users. A data store of tokens 132, for example, can include device-specific tokens and device independent tokens that can be included with inaudible sounds transmitted by devices in order to positively identify that sound. A data store of co-location indicators 133, for example, can include information that identifies, at any given moment, devices that are co-located with each other. For example, the information can be based on one or more speaker tests that occur using collocated devices and first devices. In some implementations, the information can include a time element, e.g., so that colocation information older than a threshold age (e.g., five minutes) can be purged. In this way, a confidence level of the colocation information can be maintained.

The content management system 110 can include plural engines, some or all of which may be combined or separate, and may be co-located or distributed (e.g., connected over the network 102). A device identification engine 121, for example, can identify user devices to which content is to be provided and user devices that are co-located. For example, user devices 106 that are in the same area (e.g., same room) can be identified as being co-located because they share the same, or essentially the same, GPS coordinates. Other ways of identifying co-located user devices can be used.

A device determination engine 122, for example, can make a determination, based on one or more criteria, to listen to audible or inaudible sound emitted from a first device to ascertain whether audio controls and a speaker associated with the first device are enabled. The device determination engine 122 can also identify a token that is to be played on the first device, provide a notification to a second co-located device to listen for the token emitted by the first device, and provide the token for playing on the first device. The device determination engine 122 can also receive information from the second co-located device, the information related to a recording or identification of a token in response to the notification.

A website 104 includes one or more resources 105 associated with a domain name and hosted by one or more servers. An example website is a collection of webpages formatted in hypertext markup language (HTML) that can contain text, images, multimedia content, and programming elements, such as scripts. Each website 104 can be maintained by a content publisher, which is an entity that controls, manages and/or owns the website 104.

A resource 105 can be any data that can be provided over the network 102. A resource 105 can be identified by a resource address that is associated with the resource 105. Resources include HTML pages, word processing documents, portable document format (PDF) documents, images, video, and news feed sources, to name only a few. The resources can include content, such as words, phrases, images, video and sounds, that may include embedded information (such as meta-information hyperlinks) and/or embedded instructions (such as JavaScript™ scripts).

A user device 106 is an electronic device that is under control of a user and is capable of requesting and receiving resources over the network 102. Example user devices 106 include personal computers (PCs), televisions with one or more processors embedded therein or coupled thereto, set-top boxes, gaming consoles, mobile communication devices (e.g., smartphones), tablet computers and other devices that can send and receive data over the network 102. A user device 106 typically includes one or more user applications, such as a web browser, to facilitate the sending and receiving of data over the network 102.

A user device 106 can request resources 105 from a website 104. In turn, data representing the resource 105 can be provided to the user device 106 for presentation by the user device 106. The data representing the resource 105 can also include data specifying a portion of the resource or a portion of a user display, such as a presentation location of a pop-up window or a slot of a third-party content site or webpage, in which content can be presented. These specified portions of the resource or user display are referred to as slots (e.g., ad slots).

To facilitate searching of these resources, the environment 100 can include a search system 112 that identifies the resources by crawling and indexing the resources provided by the content publishers on the websites 104. Data about the resources can be indexed based on the resource to which the data corresponds. The indexed and, optionally, cached copies of the resources can be stored in an indexed cache 114.

User devices 106 can submit search queries 116 to the search system 112 over the network 102. In response, the search system 112 can, for example, access the indexed cache 114 to identify resources that are relevant to the search query 116. The search system 112 identifies the resources in the form of search results 118 and returns the search results 118 to the user devices 106 in search results pages. A search result 118 can be data generated by the search system 112 that identifies a resource that is provided in response to a particular search query, and includes a link to the resource. Search results pages can also include one or more slots in which other content items (e.g., advertisements) can be presented.

When a resource 105, search results 118 and/or other content (e.g., a video) are requested by a user device 106, the content management system 110 receives a request for content. The request for content can include characteristics of the slots that are defined for the requested resource or search results page, and can be provided to the content management system 110.

For example, a reference (e.g., URL) to the resource for which the slot is defined, a size of the slot, and/or media types that are available for presentation in the slot can be provided to the content management system 110 in association with a given request. Similarly, keywords associated with a requested resource ("resource keywords") or a search query 116 for which search results are requested can also be provided to the content management system 110 to facilitate identification of content that is relevant to the resource or search query 116.

Based at least in part on data included in the request, the content management system 110 can select content that is eligible to be provided in response to the request ("eligible content items"). For example, eligible content items can include eligible ads having characteristics matching the characteristics of ad slots and that are identified as relevant to specified resource keywords or search queries 116. In some implementations, the selection of the eligible content items can further depend on user signals, such as demographic signals, behavioral signals or other signals derived from a user profile.

The content management system 110 can select from the eligible content items that are to be provided for presentation in slots of a resource or search results page based at least in part on results of an auction (or by some other selection process). For example, for the eligible content items, the content management system 110 can receive offers from content sponsors 108 and allocate the slots, based at least in part on the received offers (e.g., based on the highest bidders at the conclusion of the auction or based on other criteria, such as those related to satisfying open reservations and a value of learning). The offers represent the amounts that the content sponsors are willing to pay for presentation of (or selection of or other interaction with) their content with a resource or search results page. For example, an offer can specify an amount that a content sponsor is willing to pay for each 1000 impressions (i.e., presentations) of the content item, referred to as a CPM bid. Alternatively, the offer can specify an amount that the content sponsor is willing to pay (e.g., a cost per engagement) for a selection (i.e., a click-through) of the content item or a conversion following selection of the content item. For example, the selected content item can be determined based on the offers alone, or based on the offers of each content sponsor being multiplied by one or more factors, such as quality scores derived from content performance, landing page scores, a value of learning, and/or other factors.

A conversion can be said to occur when a user performs a particular transaction or action related to a content item provided with a resource or search results page. What constitutes a conversion may vary from case-to-case and can be determined in a variety of ways. For example, a conversion may occur when a user clicks on a content item (e.g., an ad), is referred to a webpage, and consummates a purchase there before leaving that webpage. A conversion can also be defined by a content provider to be any measurable or observable user action, such as downloading a white paper, navigating to at least a given depth of a website, viewing at least a certain number of webpages, spending at least a predetermined amount of time on a web site or webpage, registering on a website, experiencing media, or performing a social action regarding a content item (e.g., an ad), such as endorsing, republishing or sharing the content item. Other actions that constitute a conversion can also be used.

Figure 2:
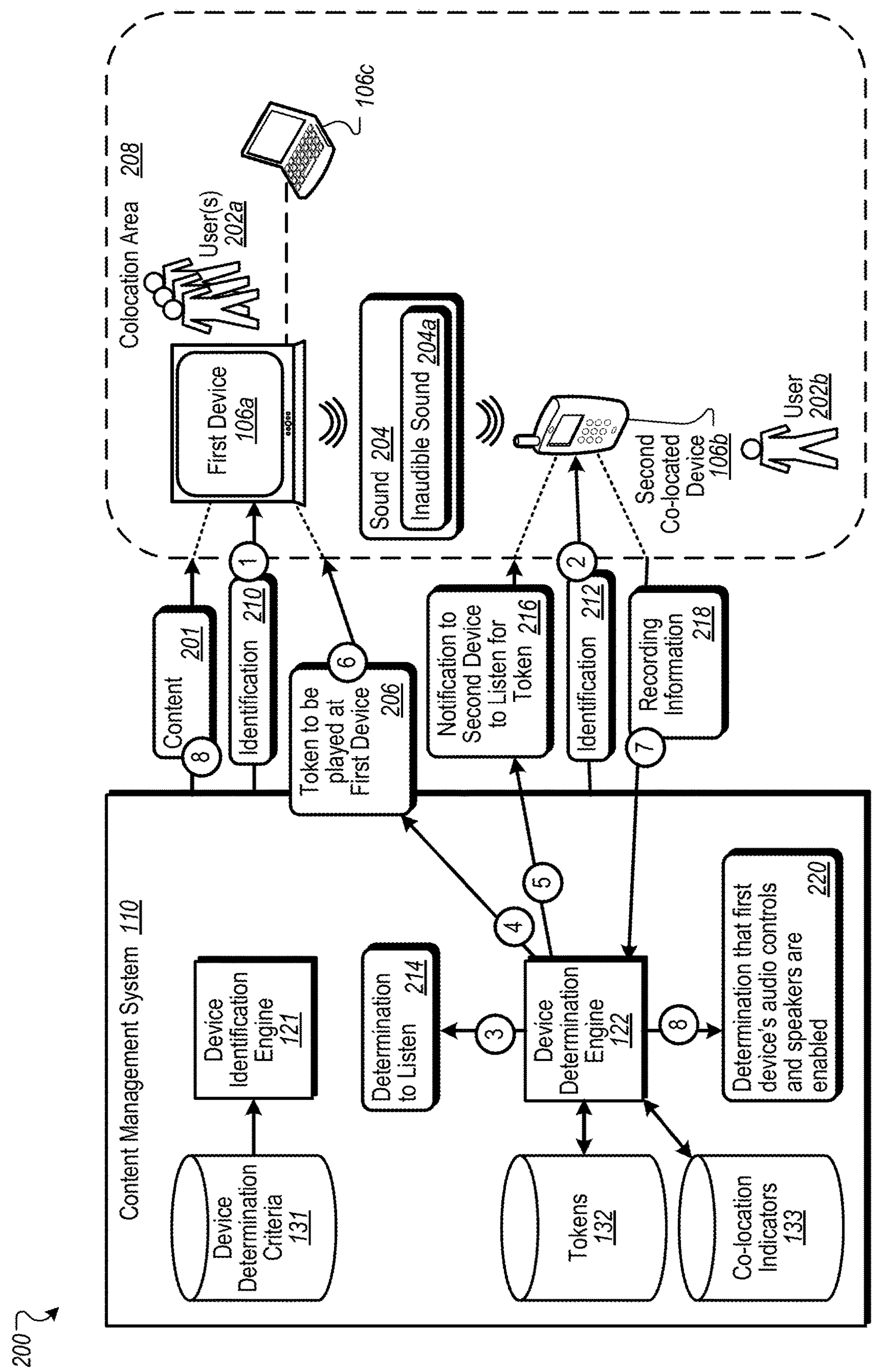
FIG. 2 shows an example system for providing content.

FIG. 2 shows an example system 200 for providing content. For example, the content management system 110 can provide content 201 to a first device 106*a*. Which content that is selected can depend on a number of factors. The content management system 110 can decide, for example, if an opportunity presents itself to reach a larger audience. For example, a device 106*b* (e.g., a smartphone, a wearable, etc.) may be likely to be used by a single user 202*b*, while another device (first device 106*a*) can be a device (e.g., having a large screen) that is likely to be experienced by multiple users 202*a*. In some implementations, different ways can be used for determining likelihoods that content may be experienced by multiple users. For example, data may be gathered from a user or device directly, be inferred based on one or more characteristics of the device or content being accessed, or otherwise developed. For example, the operating system on a user's device (e.g., the first device 106*a*) can provide information about the size of the display or display area associated with the presentation of particular content (e.g., based on the currently running app and/or environment). In another example, a model name or identifier can be determined for the device (e.g., the first device 106*a*) or information associated with a particular operating system or which version of an application/browser is running. The determined information can be used, for example, to access a database of related information from which the likelihood can be determined. In another example, information can be collected (e.g., asked of the user) and the information can be stored in user preferences or some other location (e.g., indicating that the device is used to display content to plural users simultaneously). In some implementations, content can be provided by default (e.g., without the determination of a likelihood) and feedback can be gathered to determine when plural of the co-located devices picked up the default selection. Before making a decision to provide content 201 on the first device 106*a*, the content management system 110 can determine if audio output (e.g., including speakers) on the first device 106*a* is enabled (e.g., non-muted). In some implementations, determining the audio output status of the first device 106*a* can be accomplished by having the first device 106*a* emit a sound 204 (e.g., a detectable sound 204*a*). In some implementations, the sound can be inaudible to humans. The sound can be of the form of a token, or other snippet of sound. A token 206 can be provided by the content management system 110 for playing on the first device 106*a*. The token can be included in an audio stream that includes both conventional sound (i.e., sound that is associated with a given program presented on the first device 106*a*) and the token. In some implementations, multiple speaker tests can occur initially and/or periodically to determine the status of speakers of multiple devices 106 within a colocation area 208 that includes a second co-located device 106*b* (the device doing the listening) and one or more first devices 106*a*. Example second co-located devices 106*b* include a mobile telephone, a mobile electronic device with a microphone, a desktop computer, or another electronic device with a microphone. In some implementations, the following example sequence of stages can be used to provide content based on co-located devices.

At stage 1, for example, the device identification engine 121 can identify (210) the first device 106*a* for presenting content to the one or more users 202*a*. The identification can be made, for example, because the first device 106*a* is currently receiving (or has recently received) content (e.g., resources, videos, advertisements, etc.) from the content management system 110. Identification of a particular device can include, for example, identification of characteristics of the device, such as screen size or other characteristics that can be indicative of an opportunity to present content to multiple users.

At stage 2, for example, the device identification engine 121 can identify (212) the second co-located device 106*b*. Identification of the second co-located device 106*b* can occur based, at least in part, on determining that the second co-located device 106*b* is in proximity to the first device 106*a*, e.g., within the colocation area 208. The colocation area 208 can include devices, for example, that are identified (e.g., using GPS) as being within an audible range of the second co-located device 106*b*. For example, the range can be based on speaker ranges of one or more first device(s) 106*a* and microphone capabilities of the second co-located device 106*b*, e.g., relative to hearing inaudible sounds.

At stage 3, for example, the device determination engine 122 can make a determination (214), based on one or more criteria, to use audible or inaudible sound emitted from the first device 106*a* in order to ascertain whether audio controls on the first device 106*a* and a speaker associated with the first device 106*a* are enabled. For example, the device determination engine 122 can use information associated with the first device 106*a* together with information from the device determination criteria 131 to determine which, if any, of one or more first devices 106*a* are to play a token. In some implementations, plural first devices 106*s* may be in proximity to the second co-located device 106*b* affording an opportunity to listen and identify each of the respective first devices. In some implementations, plural second co-located devices 106*b* may be in proximity to a first device 106*a*, enabling each of the plurality of devices to confirm the existence or absence of a presented token.

At stage 4, for example, the device determination engine 122 can identify the token 206 that is to be played on the first device 106*a*. For example, the token 206 can be a specific one of the tokens 132 that is selected. Different tokens 132 can be chosen by the device determination engine 122 to play on other devices 106 in the colocation area 208, such as the first device 106*a*. In some implementations, the tokens 132, for example, can serve as a registry, on a per-device basis, of tokens that are in use for the purpose of listening for sounds between co-located devices.

At stage 5, for example, the device determination engine 122 can provide a notification 216 to the second co-located device 106*b* that instructs the device to listen for the token 206 emitted by the first device 106*a*. The notification 216 can be provided, for example, at a time just before the token 206 is provided to the first device 106*a*, or slightly thereafter. In some implementations, the token is provided as part of the notification. In these implementations, the second co-located device may process received audio to identify the presence or absence of the received token. Alternatively, the processing can be performed by, for example, the device determination engine 122.

At stage 6, for example, the device determination engine 122 can provide the token 206 for playing on the first device 106*a*. For example, the token 206 can be provided coincident or included with other content that is delivered to the first device 106*a*. In some implementations, the token 206 can be a small snippet of inaudible (e.g., inaudible to humans) or sub-audible sound that is insertable into audio content that is to be played on the first device 106*a*. For example, the token 206 can be insertable into the audio of a video that is being provided to the first device 106*a* for presentation. Other ways of presenting the token 206 are possible.

Using the received token 206, the first device 106*a* can emit the detectable sound 204*a*, e.g., that includes the token 206. The second co-located device 106*b*, for example, can listen for and record the detectable sound 204*a*, including listening for and identifying the token 206. In some implementations, other devices 106 in addition to the second co-located device 106*b* that are in proximity to the first device 106*a* can also listen for the detectable sound 204*a* (e.g., when directed by the device determination engine 122).

At stage 7, for example, the device determination engine 122 can receive recording information 218 from the second co-located device 106*b*. The recording information 218 can be related to a recording made by the second co-located device 106*b* in response to the received notification 216.

At stage 8, for example, the device determination engine 122 can determine (220) whether audio controls and speakers on the first device 106*a* are enabled based on the received information. For example, the device determination engine 122 can compare the received recording information 218, including a recording of the detectable sound 204*a*, to determine if the recording includes the token 206 provided to the first device 106*a*. If there is a match between the recording and the token 206, for example, then the device determination engine 122 can conclude that speakers on the first device 106*a* are enabled. In some implementations, the determination can occur using information stored in the tokens 132, e.g., that is specific to (e.g., registered to) the first device 106*a*.

Figure 3:
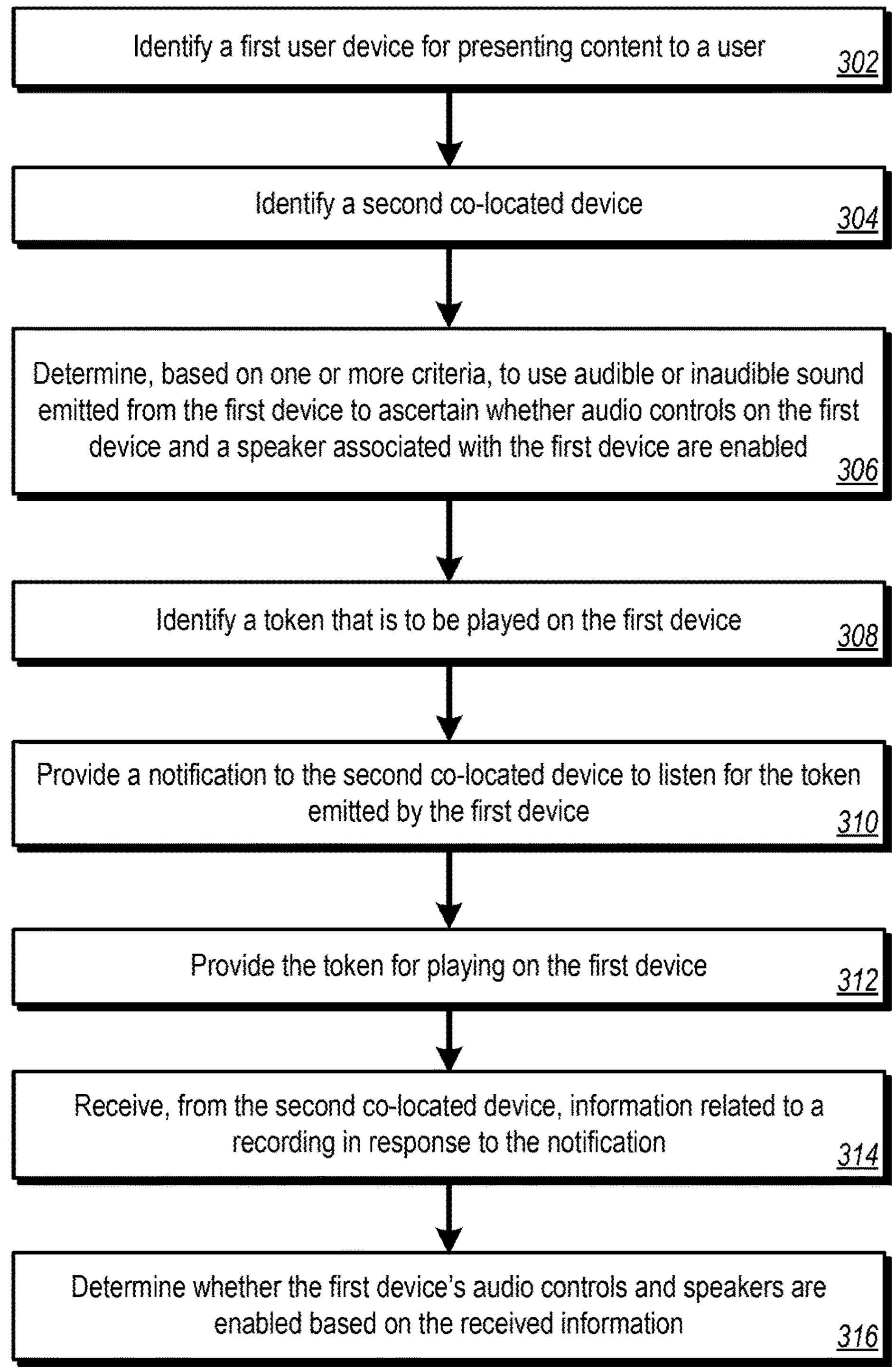
FIG. 3 is a flowchart of an example process for determining if a co-located device's speakers are enabled for presenting content.

FIG. 3 is a flowchart of an example process 300 for determining if a co-located device's speakers are enabled so as to facilitate selection of content on the co-located device. In some implementations, the content management system 110 can perform stages of the process 300 using instructions that are executed by one or more processors. FIGS. 1-2 are used to provide example structures for performing the steps of the process 300.

A first user device is identified for presenting content to a user (302). As an example, the device identification engine 121 can identify the first device 106*a* for presenting content to the one or more users 202*a*. In some implementations, the identification can be made because the first device 106*a* is currently receiving (or has recently received) content (e.g., resources, videos, advertisements, etc.) from the content management system 110.

A second co-located device is identified (304). The device identification engine 121, for example, can identify the second co-located device 106*b*, e.g., based on a determination that the second co-located device 106*b* is in proximity to the first device 106*a* (e.g., within the colocation area 208). The colocation area 208 can include devices, for example, that are identified (e.g., using GPS) as being within an audible range of the second co-located device 106*b*. For example, the range can be based on speaker ranges of one or more first device(s) 106*a* and microphone capabilities of the second co-located device 106*b*, e.g., relative to hearing inaudible sounds. Determining that the second co-located device 106*b* is in proximity to the first device 106*a*, for example, can include the use of GPS, near-field communication (NFC), a shared wifi network or location, or other techniques that indicate that devices are in the same area (e.g., in the same room).

In some implementations, determining that the second co-located device is in proximity to the first device can include determining that the second co-located device is likely to be in proximity to the first device based on stored information related to prior location checks for the first device and the second co-located device. For example, users of the devices can use a social network (or other type of) check-in feature to indicate the users' locations, and the device identification engine 121 can correlate these locations.

In some implementations, the device identification engine 121 can include or exclude third devices 106*c* that are controlling devices for presentation devices (e.g., first devices 106*a*, such as televisions). For example, controlling devices that are in proximity to the second co-located device 106*b* may be smartphones or other devices that have small screens and/or for which it would not be beneficial to re-direct content for presentation to a likely single user.

A determination is made, based on one or more criteria, to use audible or inaudible sound emitted from the first device to ascertain whether audio controls on the first device and a speaker associated with the first device are enabled (306). For example, the device determination engine 122 can make a determination, based on device determination criteria 131, whether sound should be listened to from the first device 106*a*.

In some implementations, determining, based on one or more criteria, to use audible or inaudible sound can include determining that the user (e.g., user 202*a*) is logged in, that a new session has started, that a current user session is likely to present a content item that is best presented when audio functions are enabled, or that a request for content has been determined for which one or more of the content items responsive to the request are content items that include audio. For example, the device determination criteria 131 can include these criteria and others that can signal an opportunity to present content.

In some implementations, determining to use audible or inaudible sound can be based on one or more criteria. Criteria can relate to a type of sound selected from the group comprising sub-audible, super-audible and audible sound. For example, the device determination criteria 131 can decide the types of sound that are to be listened for emitting from the first device 106*a*.

A token that is to be played on the first device is identified (308). For example, the device determination engine 122 can identify the token 206, such as an audio signature, that is to be played on the first device 106*a*. The token 206, for example, can be one of the tokens 132, and the token that is chosen can be registered or in some way associated with the first device 106*a*, e.g., to differentiate the token 206 from other tokens associated with other devices.

In some implementations, identifying the token can include identifying a signature of a sound snippet that is to be played on the first device. For example, when the device determination engine 122 identifies the token 206, the token can be a particular audio signature that, when heard by the second co-located device 106*b*, will uniquely identify the first device 106*a*.

A notification is provided to the second co-located device to listen for the token emitted by the first device (310). For example, the device determination engine 122 can provide the notification 216 to the second co-located device 106*b* to begin listening for sound (e.g., detectable sound 204*a*), specifically the token 206.

In some implementations, notification can be a push notification, the push notification can include a time to listen, and the push notification can include the token. For example, the notification 216 provided by the device determination engine 122 can indicate that the second co-located device 106*b* is to begin listening in N seconds and can indicate the token 206 that is to be listened for. In some implementations, the notification can indicate that listening is to occur multiple times, e.g., every twenty seconds or some other time period.

The token for playing on the first device is provided (312). For example, the device determination engine 122 can provide the token 206 for playing on the first device 106*a*.

In some implementations, providing the token can include providing the token in association with other content that is delivered to the first device. The token 206 can be provided, for example, coincident with other content that is delivered to the first device 106*a*.

In some implementations, providing the token can include identifying a portion of audio content that has been determined to be provided to the first device in response to actions of the user, selecting a portion of the audio content, and creating the token based on the selected portion. For example, the device determination engine 122 can identify (e.g., extract) part of audio of a content item (e.g., advertisement, video, etc.) that is being provided to the first device 106*a*. The device determination engine 122 can use that portion as the token 206 or to generate the token 206.

Information related to a recording is received from the second co-located device in response to the notification (314). As an example, the device determination engine 122 can receive recording information 218 from the second co-located device 106*b*. The recording information 218 can be related to a recording made by the second co-located device 106*b* of the inaudible sound 204*a*.

In some implementations, the method 300 can further include processing the received information from the second co-located device to determine whether or not the audio on the first device is enabled, including comparing the received information to the token. The device determination engine 122, for example, can compare recording information 218, e.g., including a token recorded in the inaudible sound 204*a*, to determine if the recording includes the token 206 that was supplied to the first device 106*a*.

In some implementations, receiving information from the second co-located device can further include receiving the recording. For example, the recording information 218 provided by the second co-located device 106*b* can be, or include, the recording itself.

In some implementations, receiving information from the second co-located device can further include receiving an indication that the token was detected. For example, the second co-located device 106*b* can listen for the token when it is provided with the notification 216. If the second co-located device 106*b* hears the token 206, as part of the detectable sound 204*a*, the recording information 218 can indicate that the token 206 was detected. As a result, the recording information can include an indication that the token 206 was heard by the second co-located device 106*b*.

In some implementations, the method 300 can further include filtering the recording to isolate a frequency band associated with the token. For example, the recording made of the inaudible sound 204*a* can be made by filtering out frequencies of audible sounds, or by listening to specific frequencies identified by the device determination engine 122. Filtering can occur, for example, at the second co-located device 106*b* or by the device determination engine 122, or both. In some implementations, listening for the inaudible sound 204*a* can include filtering out background noise.

A determination is made whether the first device's audio controls and speakers are enabled based on the received information (316). The device determination engine 122, for example, can use the received recording information 218 to determine whether audio controls and speakers on the first device 106*a* are enabled. This can be done, for example, by determining if the received recording information 218 includes or identifies the token 206. If there is a match between the recording and the token 206, for example, then the device determination engine 122 can conclude that speakers on the first device 106*a* are enabled.

In some implementations, the method 300 can further include repeating the determining for the first device and the second co-located device at a plurality of different times, storing an indicator of a likelihood that the first device and the second co-located device are actually co-located, and using the indicator to determine whether the first device's audio controls and speakers are enabled. In some implementations, the indicators can be stored in the co-location indicators 133. The device determination engine 122, for example, can periodically listen to devices, e.g., in the colocation area 208, to determine, on an ongoing basis, which devices are co-located. For example, the periodic device listening can include turning on microphones on briefly and selectively at the second co-located device 106*b* to listen for the sound from the first device 106*a*. At a given time, the device determination engine 122 can determine a likelihood that certain devices are co-located, e.g., as a function of a time that has elapsed since a sound including a specific token was listened for and identified.

In some implementations, the method 300 can further include determining eligibility to deliver specific content to the user based on the determining whether the first devices audio controls and speakers are enabled. For example, the content management system 110 can use information that is known about the first device 106*a*, including knowledge that the device's speakers are enabled, to select content (e.g., an advertisement) having rich content. If is known, for example, that the speakers of the first device 106*a* are disabled, then the content management system 110 can select a content item that is textual and may contain little or no audio/video content.

In some implementations, the method 300 can further include determining an adjustment to a quality score used in an auction for selecting the specific content based on the determining whether the first devices audio controls and speakers are enabled. For example, the content management system 110 can increase the quality score for a content item (e.g., advertisement) that will likely be experienced on a device for which the speakers are enabled and that may be viewed by multiple users 202*a*. In some implementations, an increased quality score for a content item can increase a bid, in an auction, for presentation of the content item.

In some implementations, the method 300 can further include selecting content to deliver to the first device based on the determining. The content management system 110, for example, can select content 201 to be provided in response to a request for content that is received from the first device 106*a*. The content that is selected, for example, can be selected based on whether or not speakers at the first device 106*a* are enabled.

In some implementations, selecting content can include selecting items for inclusion in a feed associated with a social network. As an example, the content 201 that is provided by the content management system 110 can be a content item that is presented to the user 202*a* in a social network, such as in an activity stream or an adjacent area on a social network page. The content that is selected as described above can be provided in other places.

In some implementations, selecting content can include selecting sponsored content items for delivery to the first device responsive to received requests for content from the first device. For example, the content that the content management system 110 selects to provide to the first device 106*a* can be a brand-related content item or other sponsored content.

Figure 4:
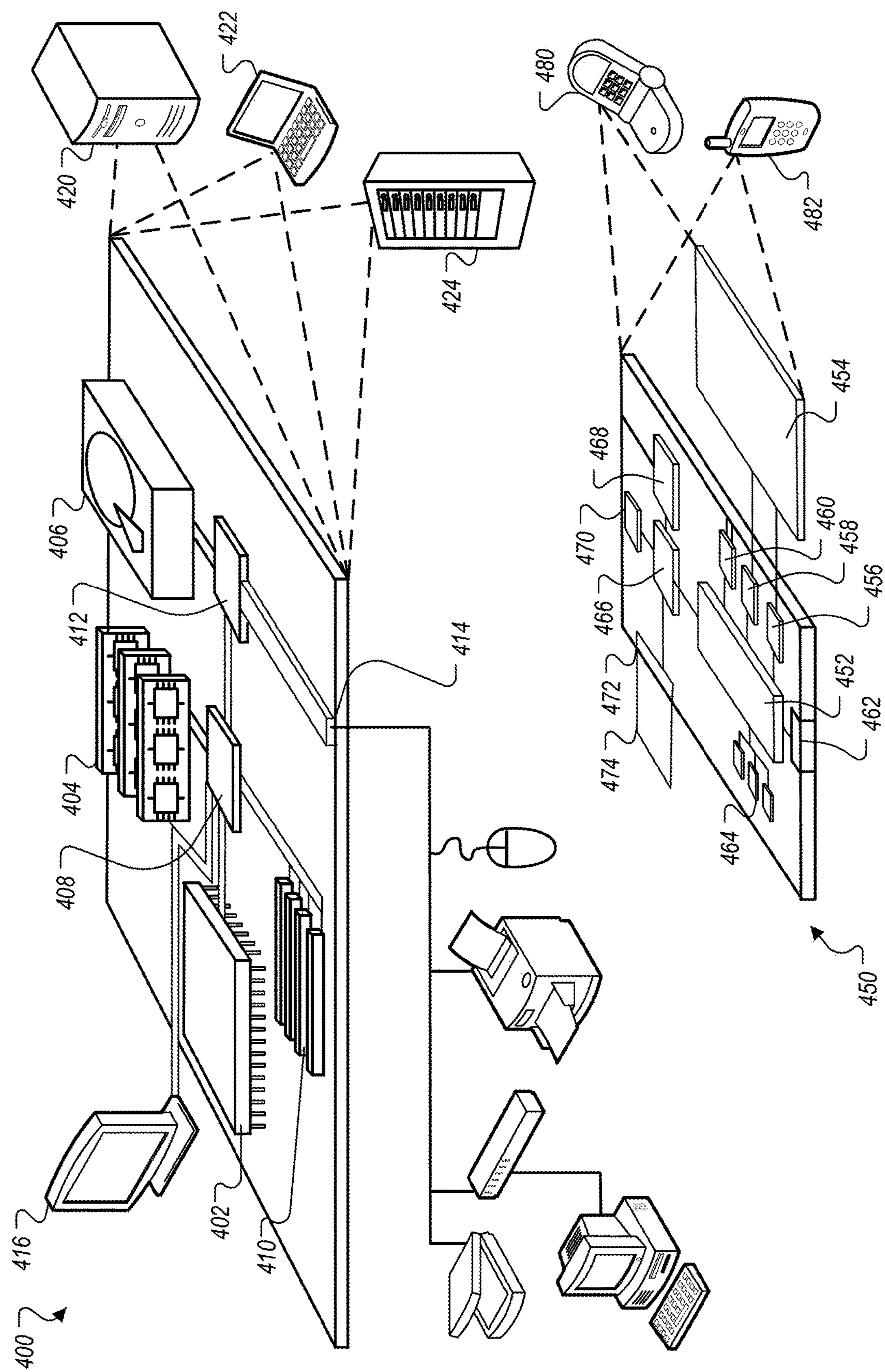
FIG. 4 is a block diagram of an example computer system that can be used to implement the methods, systems and processes described in this disclosure.

FIG. 4 is a block diagram of example computing devices 400, 450 that may be used to implement the systems and methods described in this document, as either a client or as a server or plurality of servers. Computing device 400 is intended to represent various forms of digital computers, such as laptops, desktops, workstations, personal digital assistants, servers, blade servers, mainframes, and other appropriate computers. Computing device 400 is further intended to represent any other typically non-mobile devices, such as televisions or other electronic devices with one or more processers embedded therein or attached thereto. Computing device 450 is intended to represent various forms of mobile devices, such as personal digital assistants, cellular telephones, smartphones, and other computing devices. The components shown here, their connections and relationships, and their functions, are meant to be examples only, and are not meant to limit implementations of the inventions described and/or claimed in this document.

Computing device 400 includes a processor 402, memory 404, a storage device 406, a high-speed controller 408 connecting to memory 404 and high-speed expansion ports 410, and a low-speed controller 412 connecting to low-speed bus 414 and storage device 406. Each of the components 402, 404, 406, 408, 410, and 412, are interconnected using various busses, and may be mounted on a common motherboard or in other manners as appropriate. The processor 402 can process instructions for execution within the computing device 400, including instructions stored in the memory 404 or on the storage device 406 to display graphical information for a GUI on an external input/output device, such as display 416 coupled to high-speed controller 408. In other implementations, multiple processors and/or multiple buses may be used, as appropriate, along with multiple memories and types of memory. Also, multiple computing devices 400 may be connected, with each device providing portions of the necessary operations (e.g., as a server bank, a group of blade servers, or a multi-processor system).

The memory 404 stores information within the computing device 400. In one implementation, the memory 404 is a computer-readable medium. In one implementation, the memory 404 is a volatile memory unit or units. In another implementation, the memory 404 is a non-volatile memory unit or units.

The storage device 406 is capable of providing mass storage for the computing device 400. In one implementation, the storage device 406 is a computer-readable medium. In various different implementations, the storage device 406 may be a floppy disk device, a hard disk device, an optical disk device, or a tape device, a flash memory or other similar solid state memory device, or an array of devices, including devices in a storage area network or other configurations. In one implementation, a computer program product is tangibly embodied in an information carrier. The computer program product contains instructions that, when executed, perform one or more methods, such as those described above. The information carrier is a computer- or machine-readable medium, such as the memory 404, the storage device 406, or memory on processor 402.

The high-speed controller 408 manages bandwidth-intensive operations for the computing device 400, while the low-speed controller 412 manages lower bandwidth-intensive operations. Such allocation of duties is an example only. In one implementation, the high-speed controller 408 is coupled to memory 404, display 416 (e.g., through a graphics processor or accelerator), and to high-speed expansion ports 410, which may accept various expansion cards (not shown). In the implementation, low-speed controller 412 is coupled to storage device 406 and low-speed bus 414. The low-speed bus 414 (e.g., a low-speed expansion port), which may include various communication ports (e.g., USB, Bluetooth®, Ethernet, wireless Ethernet), may be coupled to one or more input/output devices, such as a keyboard, a pointing device, a scanner, or a networking device such as a switch or router, e.g., through a network adapter.

The computing device 400 may be implemented in a number of different forms, as shown in the figure. For example, it may be implemented as a standard server 420, or multiple times in a group of such servers. It may also be implemented as part of a rack server system 424. In addition, it may be implemented in a personal computer such as a laptop computer 422. Alternatively, components from computing device 400 may be combined with other components in a mobile device (not shown), such as computing device 450. Each of such devices may contain one or more of computing devices 400, 450, and an entire system may be made up of multiple computing devices 400, 450 communicating with each other.

Computing device 450 includes a processor 452, memory 464, an input/output device such as a display 454, a communication interface 466, and a transceiver 468, among other components. The computing device 450 may also be provided with a storage device, such as a micro-drive or other device, to provide additional storage. Each of the components 450, 452, 464, 454, 466, and 468, are interconnected using various buses, and several of the components may be mounted on a common motherboard or in other manners as appropriate.

The processor 452 can process instructions for execution within the computing device 450, including instructions stored in the memory 464. The processor may also include separate analog and digital processors. The processor may provide, for example, for coordination of the other components of the computing device 450, such as control of user interfaces, applications run by computing device 450, and wireless communication by computing device 450.

Processor 452 may communicate with a user through control interface 458 and display interface 456 coupled to a display 454. The display 454 may be, for example, a TFT LCD display or an OLED display, or other appropriate display technology. The display interface 456 may comprise appropriate circuitry for driving the display 454 to present graphical and other information to a user. The control interface 458 may receive commands from a user and convert them for submission to the processor 452. In addition, an external interface 462 may be provided in communication with processor 452, so as to enable near area communication of computing device 450 with other devices. External interface 462 may provide, for example, for wired communication (e.g., via a docking procedure) or for wireless communication (e.g., via Bluetooth® or other such technologies).

The memory 464 stores information within the computing device 450. In one implementation, the memory 464 is a computer-readable medium. In one implementation, the memory 464 is a volatile memory unit or units. In another implementation, the memory 464 is a non-volatile memory unit or units. Expansion memory 474 may also be provided and connected to computing device 450 through expansion interface 472, which may include, for example, a subscriber identification module (SIM) card interface. Such expansion memory 474 may provide extra storage space for computing device 450, or may also store applications or other information for computing device 450. Specifically, expansion memory 474 may include instructions to carry out or supplement the processes described above, and may include secure information also. Thus, for example, expansion memory 474 may be provide as a security module for computing device 450, and may be programmed with instructions that permit secure use of computing device 450. In addition, secure applications may be provided via the SIM cards, along with additional information, such as placing identifying information on the SIM card in a non-hackable manner.

The memory may include for example, flash memory and/or MRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 464, expansion memory 474, or memory on processor 452.

Computing device 450 may communicate wirelessly through communication interface 466, which may include digital signal processing circuitry where necessary. Communication interface 466 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through transceiver 468 (e.g., a radio-frequency transceiver). In addition, short-range communication may occur, such as using a Bluetooth®, WiFi, or other such transceiver (not shown). In addition, GPS receiver module 470 may provide additional wireless data to computing device 450, which may be used as appropriate by applications running on computing device 450.

Computing device 450 may also communicate audibly using audio codec 460, which may receive spoken information from a user and convert it to usable digital information. Audio codec 460 may likewise generate audible sound for a user, such as through a speaker, e.g., in a handset of computing device 450. Such sound may include sound from voice telephone calls, may include recorded sound (e.g., voice messages, music files, etc.) and may also include sound generated by applications operating on computing device 450.

The computing device 450 may be implemented in a number of different forms, as shown in the figure. For example, it may be implemented as a cellular telephone 480. It may also be implemented as part of a smartphone 482, personal digital assistant, or other mobile device.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. Other programming paradigms can be used, e.g., functional programming, logical programming, or other programming. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a computing system that includes a back end component (e.g., as a data server), or that includes a middleware component (e.g., an application server), or that includes a front end component (e.g., a client computer having a graphical user interface or a Web browser through which a user can interact with an implementation of the systems and techniques described here), or any combination of such back end, middleware, or front end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any inventions or of what may be claimed, but rather as descriptions of features specific to particular implementations of particular inventions. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:

identifying, by a computing device, a first device that is configured to present content to multiple users;

determining, by the computing device, that a second device and a third device are co-located with the first device;

determining, by the computing device, characteristics of the second device and characteristics of the third device;

based on the characteristics of the second device and the characteristics of the third device, providing, for output by the computing device, an instruction to only the second device, wherein the instruction instructs the second device to output information in response to one or more types of sounds while the first device, the second device, and the third device are co-located;

providing, for output by the computing device and to the first device, an instruction to output audio that includes the one or more types of sounds;

subsequent to the audio being output by the first device, receiving, by the computing device, the information only from the second device; and in response to receiving the information only from the second device, determining that the first device is not in a muted state.

2. The method of claim 1, comprising:

determining that the second device and the third device are able to detect audio outputted by the first device, wherein determining that the second device and the third device are co-located with the first device is based on the second device and the third device being able to detect audio outputted by the first device.

3. The method of claim 1, wherein:

determining that the second device and the third device are co-located with the first device is based on determining that the second device and the third device are likely to be in proximity to the first device based on stored information related to prior location checks for the first device, the second device, and the third device.

4. The method of claim 1, further comprising selecting the audio to provide to the first device, wherein selecting the audio is based on presentation capabilities of the first device.

5. The method of claim 1, wherein the second device and the third device are one of a smart phone, or a personal digital assistant.

6. The method of claim 1, wherein the first device is a networked television.

7. A system comprising:

one or more computers and one or more storage devices storing instructions that are operable, when executed by the one or more computers, to cause the one or more computers to perform operations comprising:

identifying, by a computing device, a first device that is configured to present content to multiple users;

determining, by the computing device, that a second device and a third device are co-located with the first device;

determining, by the computing device, characteristics of the second device and characteristics of the third device;

based on the characteristics of the second device and the characteristics of the third device, providing, for output by the computing device, an instruction to only the second device, wherein the instruction instructs the second device to output information in response to one or more types of sounds while the first device, the second device, and the third device are co-located;

providing, for output by the computing device and to the first device, an instruction to output audio that includes the one or more types of sounds;

subsequent to the audio being output by the first device, receiving, by the computing device, the information only from the second device; and in response to receiving the information only from the second device, determining that the first device is not in a muted state.

8. The system of claim 7, wherein the operations comprise:

determining that the second device and the third device are able to detect audio outputted by the first device, wherein determining that the second device and the third device are co-located with the first device is based on the second device and the third device being able to detect audio outputted by the first device.

9. The system of claim 7, wherein the operations comprise:

determining that the second device and the third device are co-located with the first device is based on determining that the second device and the third device are likely to be in proximity to the first device based on stored information related to prior location checks for the first device, the second device, and the third device.

10. The system of claim 7, further comprising selecting the audio to provide to the first device, wherein selecting the audio is based on presentation capabilities of the first device.

11. The system of claim 7, wherein the second device and the third device are one of a smart phone, or a personal digital assistant.

12. The system of claim 7, wherein the first device is a networked television.

13. A non-transitory computer-readable medium storing software comprising instructions executable by one or more computers which, upon such execution, cause the one or more computers to perform operations comprising:

identifying, by a computing device, a first device that is configured to present content to multiple users;

determining, by the computing device, that a second device and a third device are co-located with the first device;

determining, by the computing device, characteristics of the second device and characteristics of the third device;

based on the characteristics of the second device and the characteristics of the third device, providing, for output by the computing device, an instruction to only the second device, wherein the instruction instructs the second device to output information in response to one or more types of sounds while the first device, the second device, and the third device are co-located;

providing, for output by the computing device and to the first device, an instruction to output audio that includes the one or more types of sounds;

subsequent to the audio being output by the first device, receiving, by the computing device, the information only from the second device; and in response to receiving the information only from the second device, determining that the first device is not in a muted state.

14. The non-transitory computer-readable medium of claim 13, wherein the operations comprise:

determining that the second device and the third device are able to detect audio outputted by the first device, wherein determining that the second device and the third device are co-located with the first device is based on the second device and the third device being able to detect audio outputted by the first device.

15. The non-transitory computer-readable medium of claim 13, wherein the operations comprise:

determining that the second device and the third device are co-located with the first device is based on determining that the second device and the third device are likely to be in proximity to the first device based on stored information related to prior location checks for the first device, the second device, and the third device.

16. The non-transitory computer-readable medium of claim 13, wherein selecting the audio to provide to the first device is based on presentation capabilities of the first device.

17. The non-transitory computer-readable medium of claim 13, wherein the second device and the third device are one of a smart phone, or a personal digital assistant.

18. The method of claim 1, wherein determining characteristics of the second device and characteristics of the third device comprises:

determining that the third device is configured to control the first device; and determining that the second device is not configured to control the first device.

* * * * *